No. 897,180. PATENTED AUG. 25, 1908.
T. R. WHITTAKER.
WATER GAGE.
APPLICATION FILED APR. 3, 1907.

Witnesses
Geo. Ackman Jr.
K. Allen.

Inventor
Thomas R. Whittaker,
By Victor J. Evans
Attorney

UNITED STATES PATENT OFFICE.

THOMAS R. WHITTAKER, OF LAWRENCE, MASSACHUSETTS.

WATER-GAGE.

No. 897,180.      Specification of Letters Patent.      Patented Aug. 25, 1908.

Application filed April 3, 1907. Serial No. 366,196.

*To all whom it may concern:*

Be it known that I, THOMAS R. WHITTAKER, a citizen of the United States, residing at Lawrence, in the county of Essex and State of Massachusetts, have invented new and useful Improvements in Water-Gages, of which the following is a specification.

My invention has relation to water gages, and it consists in the construction and arrangement of parts as will be hereinafter described and particularly pointed out in the claim.

Figure 1:
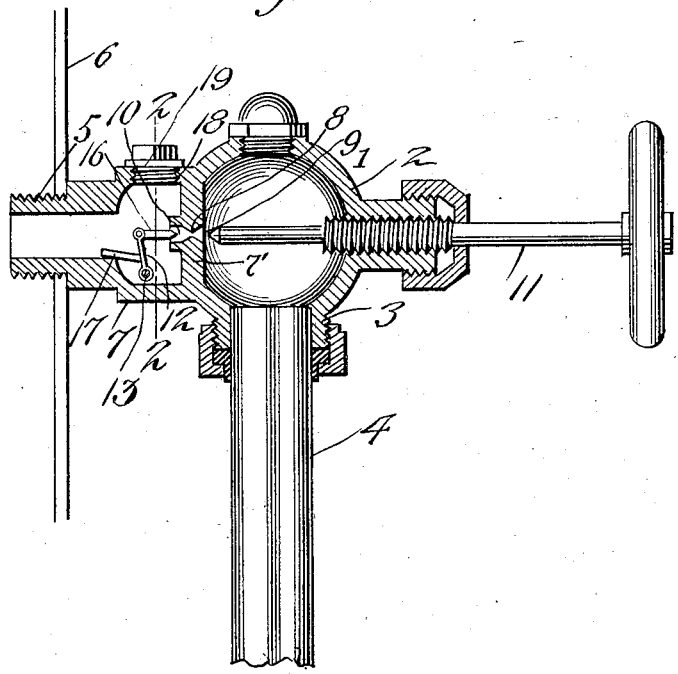
Figure 2:
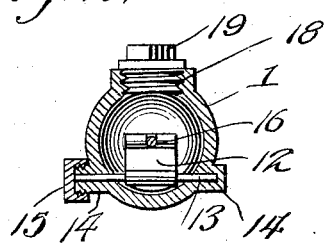

In the drawings:—Figure 1 is a sectional view illustrating the construction and application of my improvement. Fig. 2 in an enlarged sectional view on the line 2—2 of Fig. 1.

Referring particularly to the drawings, my improvement is designed for coöperation with the gage valve 1, which, except in so far as the present improvement is concerned may be of any preferred construction. The valve shown includes the globe casing 2 having a depending exteriorly threaded boss 3 to receive one end of the gage tube 4, and a threaded nipple 5, exteriorly threaded for engagement with a threaded opening in the wall 6. Intermediate the nipple 5 and the globe casing 2, the valve body is enlarged to provide an annular cut-off casing 7, in open communication with the nipple 5 and having the wall 7' arranged between the globe casing and the cut-off compartment, said wall having an opening 8 which is cut-away at its terminals in conical shape to provide valve seats 9 and 10. The usual hand operated valve 11 is formed to coöperate with the relatively forward seat 9, whereby manual control of the communication between the water column and gage tube is afforded.

The automatic attachment to which the present invention is particularly concerned comprises a leaf or plate 12 supported within the cut-off casing 7, being preferably mounted upon a pin 13 passed transversely of the casing adjacent the lower end, the ends of the pin being mounted in bearings within off-sets 14 formed on opposite sides of the casing 7. One of the bearings extends entirely through one of the off-sets for the passage of the pin 13 through the leaf plate, and said bearing is closed by a cap 15 to secure the pin against accidental displacement. The leaf 12 is loosely mounted on the pin 13 and is connected at its relative upper end with a valve pin 16, the forward or free end of which is shaped for effectual coöperation with the valve seat 10. The plate 12 is further provided on the rear surface with a weighted arm 17 adapted to overbalance the weight of the pin 16 and normally maintain said pin in open position.

The wall of the cut-off casing 7 is formed in the relative upper portion with an opening 18 of a size to permit convenient passages therethrough of the plate 12 and connected weight arm and valve pin, said opening being adapted to be closed by threaded plug 19 formed for the convenient manipulation by a wrench to insure a steam tight closure.

In the use of the device, it will be understood that, as long as the gage 2 is intact and the valves 11 open, the circulation of the steam or water will equalize the pressure on both sides of the plate 12, thereby permitting the weighted arm 17 to maintain the plate 12 in position to withdraw the pin 16 from its seat. Upon breakage of the tube, however, the pressure on the relatively forward side of the plate 12 is at once reduced with the effect to move the pin 16 in the valve closing position, thereby closing the communication between the tube and water column.

As previously stated, I am aware that the use of an automatic attachment for this purpose is not broadly new, but the gist of the present invention resides in the arrangement of the automatic attachment, whereby it is rendered conveniently accessible at all times without disturbing the connection of the gage valves with the water column. This important feature results from the structure shown and described, it being understood that upon the removal of the pin 13 and the plug 19 the automatic attachment is entirely accessible for removal.

By the disposition of the cut-off casing between the connection of the gage valve with the water column and with the gage, I am enabled to inspect, remove, or repair the automatic attachment without in any way interfering with the attachment of the gage valves with the water column or with the gage.

Having described the invention, what I claim as new and desire to secure by Letters Patent is:—

A water gage comprising a globe casing and a cut-off casing, a wall therebetween having communicating valve seats therein, a valve in the globe casing to engage one of the valve seats in one side of the wall, the cut-off casing having an opening therein, a leaf plate provided with a weighted arm and a valve pin which may be inserted through said opening and into the cut-off casing, means for closing said opening, the cut-off casing having off-sets on opposite sides thereof provided with bearings therein, a pin mounted in said bearings, one of the bearings being constructed to extend continuously through one of the off-sets to permit the pin to engage and support the leaf plate and said valve pin of the leaf plate serving to engage the valve seat in the other side of said wall and means on the end of the off-set having the continuous bearing therein serving to prevent displacement of said pin, substantially as specified.

In testimony whereof, I affix my signature in presence of two witnesses.

THOMAS R. WHITTAKER.

Witnesses:
CHARLES E. COAKLEY,
JAS. W. ROBINSON.